(12) United States Patent
Kasparian et al.

(10) Patent No.: US 9,758,399 B2
(45) Date of Patent: Sep. 12, 2017

(54) SELF-SUSTAINING WATER RECLAMATION BIOTREATMENT SYSTEM

(71) Applicants: Kaspar A. Kasparian, Raleigh, NC (US); Eric H. Verret, Montreal (CA)

(72) Inventors: Kaspar A. Kasparian, Raleigh, NC (US); Eric H. Verret, Montreal (CA)

( * ) Notice: Subject to any disclaimer, the term of this patent is extended or adjusted under 35 U.S.C. 154(b) by 523 days.

(21) Appl. No.: 14/212,921

(22) Filed: Mar. 14, 2014

(65) Prior Publication Data

US 2014/0263048 A1 Sep. 18, 2014

Related U.S. Application Data

(60) Provisional application No. 61/783,292, filed on Mar. 14, 2013.

(51) Int. Cl.
*C02F 3/02* (2006.01)
*C02F 3/30* (2006.01)
*C02F 3/00* (2006.01)

(52) U.S. Cl.
CPC .......... *C02F 3/006* (2013.01); *C02F 3/301* (2013.01); *C02F 2201/009* (2013.01); *Y02W 10/37* (2015.05)

(58) Field of Classification Search
CPC ........ Y02W 10/37; C02F 3/302; C02F 3/006; C02F 2201/009; C02F 2209/005; C02F 3/301; C02F 3/1247; C02F 3/30

USPC .......... 210/605, 620, 629, 630, 143
See application file for complete search history.

(56) References Cited

U.S. PATENT DOCUMENTS

| | | | |
|---|---|---|---|
| 6,798,080 B1 | 9/2004 | Baarman et al. | |
| 7,008,538 B2 | 3/2006 | Kasparian et al. | |
| 7,850,848 B2 | 12/2010 | Limcaco | |
| 8,216,471 B2 | 7/2012 | Ren et al. | |
| 2002/0104807 A1* | 8/2002 | Keeton, Jr. ......... | B01F 3/04113 210/620 |
| 2005/0040107 A1* | 2/2005 | Kasparian ............... | C02F 1/444 210/636 |
| 2009/0166300 A1* | 7/2009 | Osborn ................. | B01F 3/0473 210/760 |
| 2011/0146751 A1 | 6/2011 | McGuire et al. | |
| 2012/0097590 A1 | 4/2012 | Early et al. | |
| 2012/0152829 A1 | 6/2012 | Henderson et al. | |
| 2012/0234769 A1 | 9/2012 | Bittenson | |

FOREIGN PATENT DOCUMENTS

DE 19520733 C1 10/1996
JP 2006-218383 A 8/2006

* cited by examiner

*Primary Examiner* — Claire Norris
(74) *Attorney, Agent, or Firm* — Myers Bigel, P.A.

(57) ABSTRACT

A process approach allows economical self-sustained operation of single vessel biotreatment systems for municipal wastewater treatment. The daytime solar powered treatment process is changed during darkness periods to operate the biotreatment system without electric grid powering.

8 Claims, 8 Drawing Sheets

SELF-SUSTAINING WATER RECLAMATION BIOTREATMENT SYSTEM

CLAIM OF PRIORITY

This application claims priority to U.S. provisional patent application No. 61/783,292 entitled "SELF-SUSTAINING WATER RECLAMATION BIOTREATMENT SYSTEM" filed on Mar. 14, 2013, which application is incorporated herein by reference in its entirety.

FIELD OF THE INVENTION

The present invention relates to water reclamation and wastewater treatment, and more particularly, to single vessel biotreatment water reclamation systems with aerobic, anoxic and clarification treatment zones, and methods for self-sustained operation of such systems.

BACKGROUND OF THE INVENTION

With the global population exploding at around 7 billion and around 2.6 billion people not having access to usable water, a major global crisis may be looming. According to a November 2006 L.A. Times article, dirty water is becoming a leading cause of infant death globally, and may be responsible for the deaths of up to 1.8 million children under age 5. Global water use may also be increasing faster than population growth, and global water demands are expected to increase by up to 40% in this decade. It is believed that up to two-thirds of the world may experience water scarcity by 2025, and some countries may be on the verge of crippling demographic crisis from shortage of clean water.

One way of addressing water scarcity is treating and reusing municipal water, since much of it is typically lost as wastewater. Such wastewater can also cause environmental problems, including pollution of scarce fresh water sources into which the wastewater often ends up. There are many processes and systems for treating wastewater and reclaiming the treated water for irrigation and reuse in various ways. However, many effective approaches can require electric power, which is another commodity that may not be readily available and/or may be costly in many developing nations. Solar powering of such systems can provide the power required for daytime operation. However, two challenges relating to solar powering include (i) how to keep the cost of solar arrays and their ancillaries economical relative to the water treatment plant cost, and (ii) how to perform treatment during darkness periods, also at reduced or minimum cost. It would also be helpful for such a solar powered system to require relatively little electric power to operate.

A wastewater biotreatment system that performs all its treatment in a Single Vessel Multi-zone Bioreactor (SVMB) has electrical requirements. Such a system is described in U.S. Pat. No. 7,008,538, and may refer to a single vessel biotreatment system that has a blower for aeration and a gearbox motor for its sludge rake. If the wastewater is not being fed by gravity, then a feed pump can be used for delivering the influent into the bioreactor and add to the electrical load. Such a system can be powered by a solar panel during daytime, and can operate over the electric grid at nighttime. However, such solar powering may not be economical in terms of the initial cost of the solar panel, which would require being oversized to accommodate starting currents that can range up to six times the running current for single phase motors and up to 3 times the running currents for three phase motors. Furthermore, a main load of the system, the aeration blower, would typically operate near its full design output a majority of the time. Thus, reducing or minimizing the electric load requirements can in turn reduce or minimize the size and cost of the solar panel that would be required for solar powering, and the electrical grid powering costs when the system is operating off the electric grid.

Also, a solar-grid powering approach may not be implementable in all circumstances. For example, in many parts of the world, there may be a scarcity of electric power and/or power interruptions during daytime and/or after darkness. In many villages and work camps, as an example, there may be no grid source electricity, and basics are sometimes met through the use of costly electric generators that may continuously require fuel and routine maintenance. Accordingly, one solution for the above single vessel biotreatment system (in both areas without adequate electric grid power as well as other areas) is for the water reclamation plant to be self-sustaining. Full reliance on batteries in darkness periods may be possible, but the size/quantity of such batteries that would be needed to power practical size water reclamation plants may be cumbersome and/or prohibitive in cost.

Some previous patents and publications may not provide solutions towards meeting the above problems. For example, U.S. Patent Application Publication No. 2011/0146751 (McGuire et al.) relates to a non-self-sustaining traditional solar power system with battery storage or generators. In particular, it relates to providing a mobile solar power station for providing electricity to living and working and powering a related drinking water filtration system, ventilation system and telecommunications equipment.

U.S. Patent Application Publication No. 2012/097590 (Early et al.) generally relates to a wastewater treatment system within a cylindrical storage vessel, using an electromagnetic precipitator approach that removes particles and chemicals for treating the liquid. It describes biological reduction of BOD-5 (Biochemical Oxygen Demand Over 5 Days) from wastewater, as well as COD (Chemical Oxygen Demand), Nitrates and Phosphorus and treating sludge.

U.S. Patent Application Publication No./152829 (Henderson et al.) generally discusses various generic wastewater treatment processes and a method for treating wastewater that includes capturing oxygen and carbon dioxide to promote the growth of algae contained within the wastewater treatment system, which may contribute to eutrophication in water bodies where the treated wastewater is discharged. Eutrophication can have negative environmental effects, including reductions in fish life and other life-forms.

U.S. Patent Application Publication No. 2012/0234769 (Bitterson) generally relates to plasma-based devices, systems and methods wherein non-thermal plasmas can be employed for treatments of liquids or liquid streams for the removal or modification of chemical contaminants, such as arsenic.

U.S. Pat. No. 6,798,080 (Baarman et al.) generally relates to method of generating electrical power from water filtration systems by the water operating a turbine and generator for producing electricity.

U.S. Pat. No. 7,850,848 (Limacaco) generally describes a 'self-sustaining' wastewater treatment facility that abates greenhouse gas abatement to capture $CO_2$ and produce biomass to address environmental needs. The treatment facility can include an array of rotating media wheels that create an ordered mixing of algae for sustained growth. The biomass that may be collected from the rotating media wheels can be used for other processing, such as producing bio-fuels. The system can be expanded to fuel further algal growth.

U.S. Pat. No. 8,216,471 (Ren et al.) generally relates to a bioreactor for treatment of concentrated organic wastewater. The process of treatment may rely on a moving bed bioreactor (MBBR) and an upflow of anaerobic sludge using the same. The bioreactor can include an inner layer and an outer layer, in which the inner layer can be an upflow anaerobic sludge blanket (UASB) and the outer layer can be a moving bed biofilm reactor (MBBR).

German patent document DE 195 20 733 (Heinz et al.) generally pertains to a botanical water treatment plant that can include a gas-tight vessel located within a water effluent collection shaft that receives effluent water in batches from a storage vessel. Ventilation shafts within the gas-tight vessel can be linked to a compressor by a pipe and valve. Water can be transferred from layers above the sludge into a botanical filter bed. The compressor can be electrically-powered, deriving power from the mains, wind, or solar energy.

Japanese patent document 2006-218383 (Toshiya) generally relates to high water content organic waste treatment systems including a latent heat recovering vacuum dryer, which can dry dehydrated cakes that have high water content organic waste. A waste heat recovery portion of the system can employ a boiler for generating steam and driving a turbine, etc. Also, Japanese patent document 11-50509 (Koji et al) generally discusses solar powering of a flush toilet for remote areas with a simple solar panel.

SUMMARY OF THE INVENTION

Embodiments of the present invention relate to solar and self-sustained operation of a type of single vessel multi-zone bioreactor (SVMB) water reclamation systems. A SVMB system is also described in commonly owned U.S. Pat. No. 7,008,538, the disclosure of which is incorporated by reference herein. In particular, embodiments of the present invention provide power consumption reduction enhancements to allow a reduced or smallest viable solar panel and ancillary powering during daylight hours, plus the capability of economically operating off the electric grid during darkness hours and/or applying process changes to allow self-sustained operation without electric grid powering during darkness periods.

The self-sustaining SVMB of some embodiments of the invention includes adjacent aerobic, anoxic, and clarification zones, and biotreatment interaction between aerobic and anoxic zones for nutrient removal. The SVMB performs aerobic, anoxic, clarification, facultative, anaerobic and sludge treatment in a single vessel to effectively treat wastewater and remove nutrients that are harmful to water bodies, such as Nitrates and Phosphates. In contrast, some traditional non-self-sustaining SVMBs, which are in commercial use for both municipal and industrial applications, have other configurations and use electric grid powering.

Some embodiments of the invention allow the SVMB to provide power-efficient, solar-grid wastewater treatment, for example, where there may be water shortage and/or where wastewater treatment and water reuse may be required. Also, some embodiments of the invention can provide solutions for economical solar powering during daylight hours, as well as modified processes for darkness periods to allow self-sustained operation.

Accordingly, some embodiments of the present invention can provide a more efficient SVMB with adjacent aerobic and anoxic zones so as to allow economical solar powering with a reduced or smallest viable solar panel and its ancillaries during daytime operation, and to allow economical operation of the system during darkness periods using power from the electric grid.

Some embodiments of the present invention can further provide a more efficient SVMB system with adjacent aerobic and anoxic zones to allow economical solar powering with a reduced or smallest viable solar panel and its ancillaries during daylight hours, and to allow economical operation of the system during darkness periods without using the electric power grid or electric generators. In particular, embodiments of the present invention may use process changes and other enhancements during darkness periods to allow self-sustained operation of the modified SVMB.

According to some embodiments, a solar and grid powered single vessel biotreatment system (SVMB) for water reclamation with adjacent aerobic and anoxic treatment zones includes a solar panel array including one or more ancillaries configured to power said system; adjustable ports located in between said adjacent aerobic and anoxic zones for adjusting retention time and oxygenation of said anoxic zone; a flow sensor configured to adjust said retention time as a default position of said adjustable ports; a rake motor; a dissolved oxygen sensor configured to sense an oxygen level in the anoxic zone; a programmable logic controller (PLC) and power controller for controlling said system with programmed instructions; an aeration blower configured to aerate said aerobic zone being controlled by a soft starter and variable frequency drive (VFD); means of providing wastewater into said system; and a switching device configured to switch said system from solar to electric grid powering during insufficient solar energy periods.

According to further embodiments, a single vessel biotreatment system (SVMB) for water reclamation with adjacent aerobic and anoxic treatment zones, operating by solar power during sufficient sunlight availability, includes a solar panel array and an ancillaries group, including a battery bank, inverter and a power tracker; a blower including a soft starter and variable frequency drive; a rake motor; an influent pump including a soft starter and level switches; an air compressor; an air cylinder configured to store air; adjustable ports disposed between said aerobic and anoxic zones; an air diffuser connected to said air cylinder located in said aerobic zone; and a PLC and power controller configured to control said system.

According to still further embodiments, a method for solar powering and self-sustained operation of a single vessel biotreatment system (SVMB) includes sensing sufficient sunlight during daytime periods by a power tracker configured to power said SVMB with a solar panel array and its ancillaries group and a PLC and power controller; employing a variable frequency drive to control a speed of a blower; employing adjustable ports to control dissolved oxygen in an anoxic zone; providing priority to said adjustable ports to control dissolved oxygen levels in said anoxic zone in lieu of adjusting the speed of said blower; operating a compressor during daylight hours to fill air into an air cylinder; and operating an influent pump as called for by level switches. The method further includes sensing insufficient sunlight by said power tracker, and said PLC and power controller then switching said SVMB into darkness period operating mode and employing a battery bank and an inverter; and operating said influent pump intermittently; stopping said blower; stopping a rake motor; controlling intermittent air release from said air cylinder into an aerobic zone; and employing said adjustable ports for controlling dissolved oxygen in said anoxic zone.

According to yet further embodiments, a self-sustained operating single vessel biotreatment system (SVMB) for water reclamation with adjacent aerobic and anoxic treatment zones, operating by solar power during sufficient sunlight availability, includes a solar panel array and an ancillaries group, including a battery bank, inverter and a sun power tracker; a blower including a soft starter and variable frequency drive; a rake motor; an influent pump including a soft starter and level switches; an air mixer located in said aerobic zone; adjustable ports disposed between said aerobic and anoxic zones; an air diffuser connected to said air mixer located in said aerobic zone; and a PLC and power controller configured to control said SVMB.

According to still yet further embodiments, a method for solar powering and self-sustained operation of a single vessel biotreatment system (SVMB) having adjacent aerobic and anoxic treatment zones, includes sensing sufficient sunlight by a power tracker during daytime periods for powering said SVMB with a solar panel array and its ancillaries group and a PLC and power controller; powering said SVMB by said solar panel array and its ancillaries group; employing a variable frequency drive to control a speed of a blower; employing adjustable ports configured to control dissolved oxygen in said anoxic zone; providing priority to said adjustable ports to control dissolved oxygen levels in said anoxic zone in lieu of adjusting the speed of said blower; and operating an influent pump as called for by level switches. The method further includes sensing insufficient sunlight by said power tracker and said PLC and power controller switching said SVMB into darkness period operating mode and employing a battery bank and an inverter; and operating said influent pump intermittently; stopping said blower; stopping a rake motor; operating an air mixer periodically to aerate said aerobic zone; and employing said adjustable ports to control the dissolved oxygen in said anoxic zone.

The above embodiments can improve or optimize electric energy usage during daytime operation of SVMB systems, and/or improve the power usage and treatment process during darkness periods to further reduce electric power requirements when solar powering is not possible.

DETAILED DESCRIPTION

A description of prior art Single Vessel Multi-zone Bioreactor systems with adjacent aerobic and anoxic zones and their processes is provided herein to enable a better understanding of some embodiments of the invention. The term 'darkness periods' may be used herein to refer to nighttime conditions and/or to conditions when available sunlight is less than the minimum light required by a solar panel for its required output. The term 'daylight' may be used herein to refer to conditions when there is sufficient sunlight to meet the minimum requirements of a solar panel for producing its needed design output.

Figure 1:
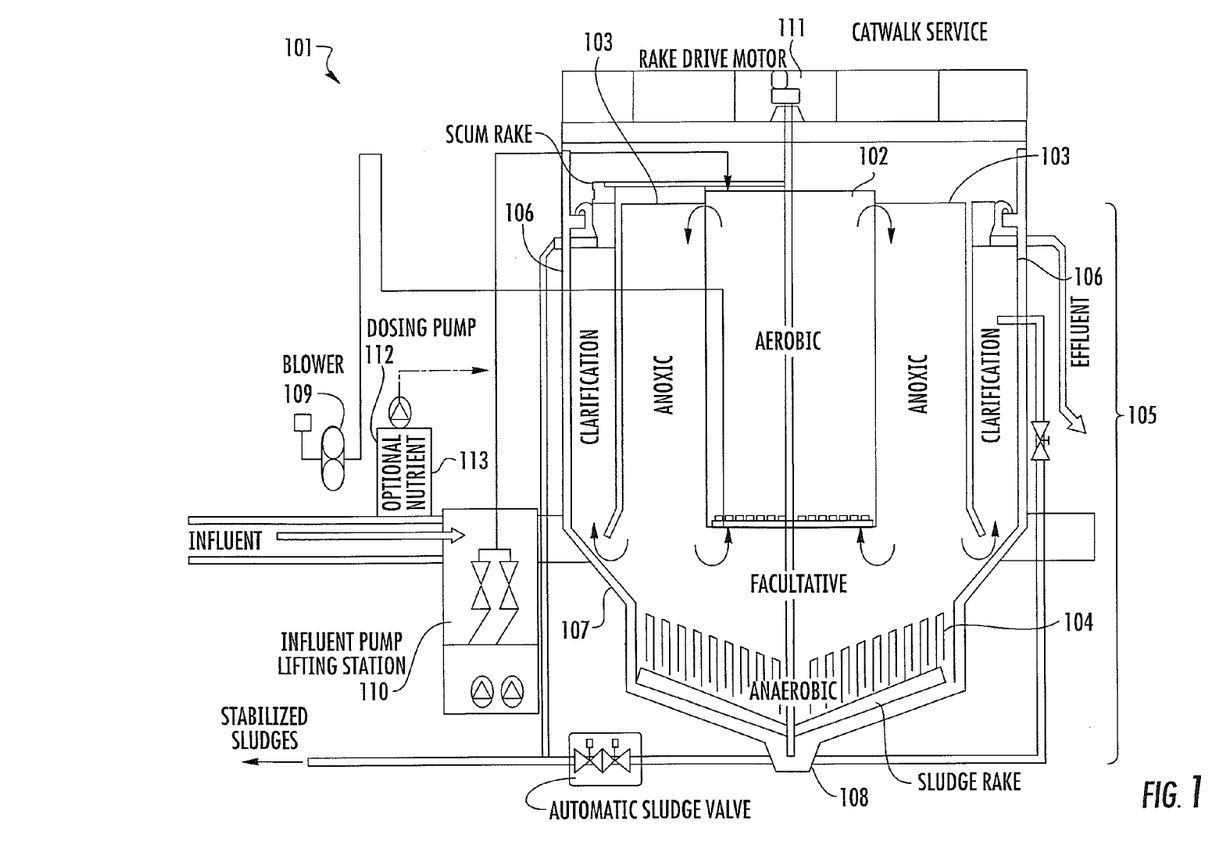
FIG. 1 illustrates a Single Vessel Multi-zone Biotreatment (SVMB) system without power consumption reduction provisions and without self-sustained operation capability.

Referring to FIG. 1, a Single Vessel Multi-zone Bioreactor (SVMB) water reclamation system 101 has three treatment environments (aerobic 102, anoxic 103 and anaerobic 104 zones). Those treatment zones 102, 103, 104 are controlled and are contained in a single vessel 105. Such an arrangement can create a favorable condition for the populations and diversity of organisms that may be required for effective and faster wastewater treatment, and is further described in U.S. Pat. No. 7,008,538.

As shown in FIG. 1, the SVMB 105 is a cylindrical vessel with three vertically stacked treatment zones. The uppermost zones include the innermost aerobic zone 102, its adjacent anoxic zone 103 and outermost clarification zone 106. Below the upper zones is the middle or facultative zone 107. The lower zone 104 is referred to as anaerobic and below it is the sludge treatment zone 108, at the very bottom of the vessel 105.

Referring further to FIG. 1, in the aerobic zone 102, the microbes degrade and make soluble the waste material, breaking down complex organic compounds. The organisms within the facultative 107 and the anaerobic 104 zones absorb that soluble matter, converting it to simpler fatty acid compounds which then float up to be processed by aerobic organisms within the upper aerobic zone 102 and then in the upper adjacent anoxic 103 and outermost adjacent clarification 106 zones. Biological or chemical nutriments can be dosed to enhance the treatment through fostering the desirable varieties and diversity of the microbial population.

In further detail, wastewater is introduced into the SVMB system 101 of FIG. 1 at the top of the vessel in the aerobic zone 102. The heavy suspended biosolids, along with other waste material, settle by gravity from the aerobic zone 102 down through the middle facultative zone 107, into the bottom anaerobic zone 104. The organic material deposited in the bottom zone 104 is then fermented in the anaerobic environment, producing fatty acids. The air that is introduced into the system above the anaerobic zone 104 then carries the fatty acids into the upper aerobic treatment zone 102 for oxidation by the action of contact with oxygen in that air. The moving air also creates the circulation that is typically necessary through the upper treatment zones, thus eliminating the need for pumps in FIG. 1. The byproducts of the oxidation that are left after aerobic treatment are removed in the upper anoxic zone 103 that is adjacent to the aerobic zone 102.

A controlled and continuous circulation between the aerobic 102 and anoxic 103 zones performs further treatment in those zones and the clean water is discharged from the upper outermost clarification zone 106 that is adjacent to the anoxic zone 103.

Embodiments of the present invention arise from realization that a SVMB requires a minimum amount of electric power when adapting to real-life fluctuating flow characteristics, whether operating on solar power or electric grid power and during startup of its motors, and that there may be many advantages if a SVMB system could be powered with an economical solar power source and achieve fully self-sustained operation.

As solar powering has become more readily available, wastewater systems can be solar powered during daytime and operate with electric power from the grid during darkness periods. However, investors and buyers may need to take into consideration the cost per kilowatt (kW) or Kilowatt-Hour of the solar powering system and/or the impact of the solar powering costs on the cost of the overall wastewater treatment system. Thus, the power usage efficiency of the system may be important, since it can affect the size and/or capacity requirements of the solar powering system, and/or the overall cost of the solar powered wastewater treatment system. Also, as such solar powering can typically work only during daylight hours (and thus, may still require electricity from electric power grids during darkness periods), reducing or minimizing power usage during electric grid powering could provide significant savings for the system user.

Accordingly, embodiments of the present invention provide a single vessel multi-zone biotreatment system (SVMB) with adjacent aerobic and anoxic zones, which is sufficiently efficient with respect to electric power requirements so as to allow the use of an economical solar powering system for daylight use. Embodiments may also be efficient when operating over the electric grid during darkness periods where grid powering is available.

Furthermore, embodiments of the present invention provide a. SVMB system that is sufficiently or optimally power efficient so as to allow the use of a reduced or smallest viable solar panel array and its ancillaries for daylight powering, and also is capable of operating without solar powering during darkness periods, to achieve self-sustained operation. Operating such a type of SVMB without solar or grid power during darkness periods can require particular process changes during darkness hours, as using batteries alone for darkness periods may require substantial battery capacities, which may be prohibitive in cost and/or may increase maintenance requirements.

Some embodiments of the invention relate to improving or optimizing the SVMB process for economical solar powering during daytime and economically operating the system during darkness periods with grid powering or process changes.

The main electric power consumers in a SVMB as shown in FIG. 1 include the aeration blower 109, the customer's influent pump 110 (if no flow by gravity is available), with its liquid level switches, the sludge rake motor 111, and some dosing pumps 112 for optional nutriment dosing and post-treatment chlorination. Of the aforementioned electric loads, the aeration blower 109 typically requires the most power, followed by the influent pump 110 (if used) and followed by the rake motor 111, which typically has a fractional horsepower motor driving a gear box. The least power consumers include the optional nutriment dosing pump 113 and the disinfection chlorination dosing pump that operate intermittently with low power consumption. Furthermore, the starting currents of the electrical motors may be important since single-phase motors typically require around 6 times their running current and three-phase motors typically require around 3 times their running currents. Some embodiments of the invention reduce or minimize the above power requirements during daytime and especially during darkness periods where there is no powering from a solar panel array.

Figure 2:
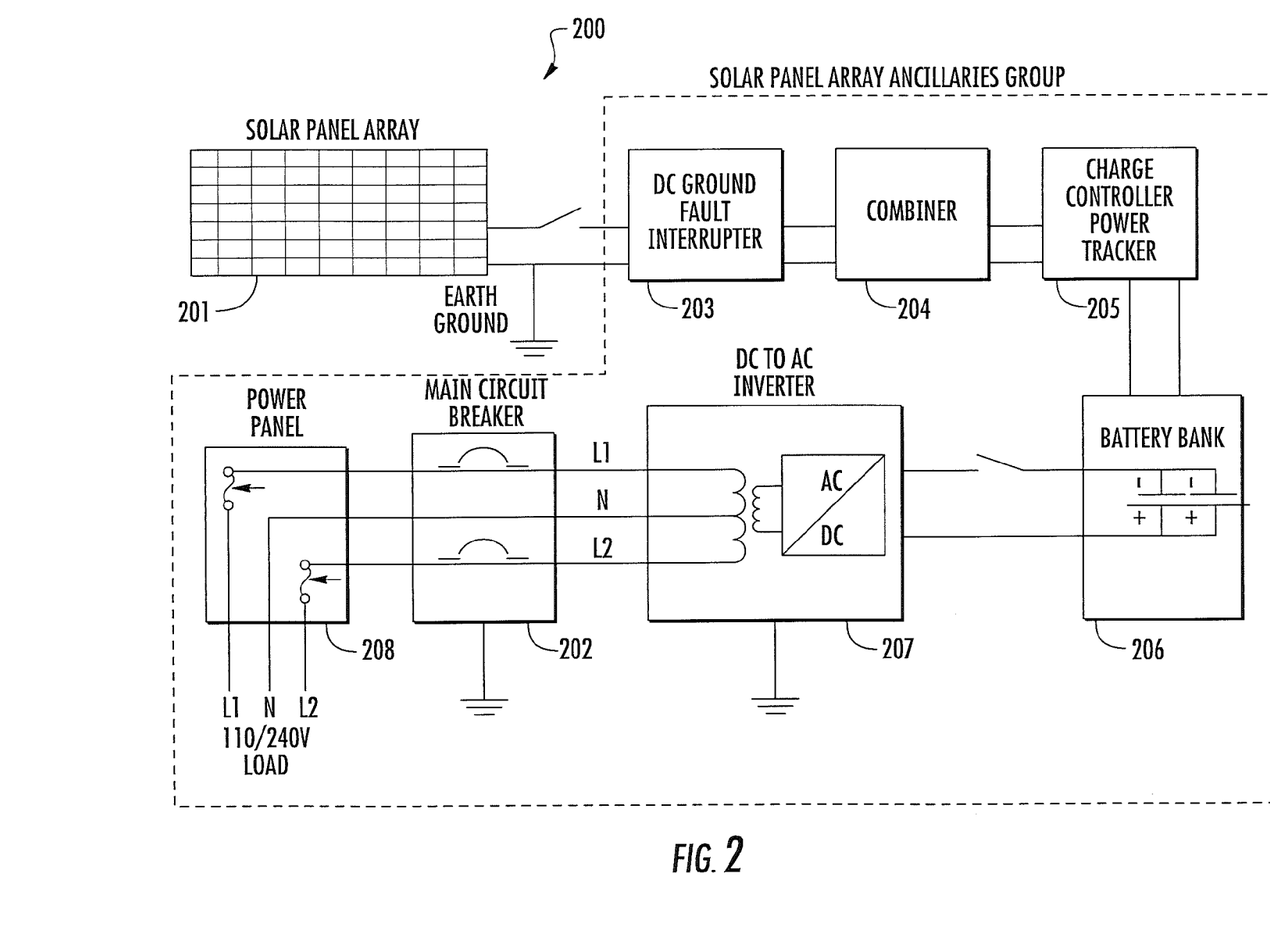
FIG. 2 illustrates a solar powering scheme, including a solar panel array and its ancillaries group, which can be used in some embodiments of the invention.

FIG. 2 illustrates a solar powering system 200 that may be used for solar-grid applications. Various technologies of using solar powering systems are known and some are here mentioned within the scope of the invention. The DC output of the solar panel array 201 can be configured for various DC outputs depending on how the panels of the solar panel array 201 are wired. A main breaker 202 follows the solar panel array with electrical earthing and lightning protection. A ground fault interrupter 203 provides protection against hazardous ground faults. A combiner 204 combines various DC inputs from the solar panels into one DC output. A charge controller and power tracker 205 controls the charging of the battery bank 206 and tracks the available sun power. The battery bank 206 has the dual function of providing a stable input into the DC to AC inverter 207 during power fluctuations and also provides powering of some electrical loads during darkness periods. Many types of batteries can be used, such as deep cycling type lead-acid batteries and/or lithium-Ion batteries. The DC to AC inverter 207 provides AC power output for AC power loads. It is normally followed by circuit breakers 202 and a power panel 208 with protective fuses and connection points for electric loads. Earth connections are used throughout as shown to prevent stray voltages. A single-axis or multi-axis solar panel array tracker can be used to track the sun and improve/maximize the solar energy input into the solar panel array during sunlight hours.

Figure 3A:
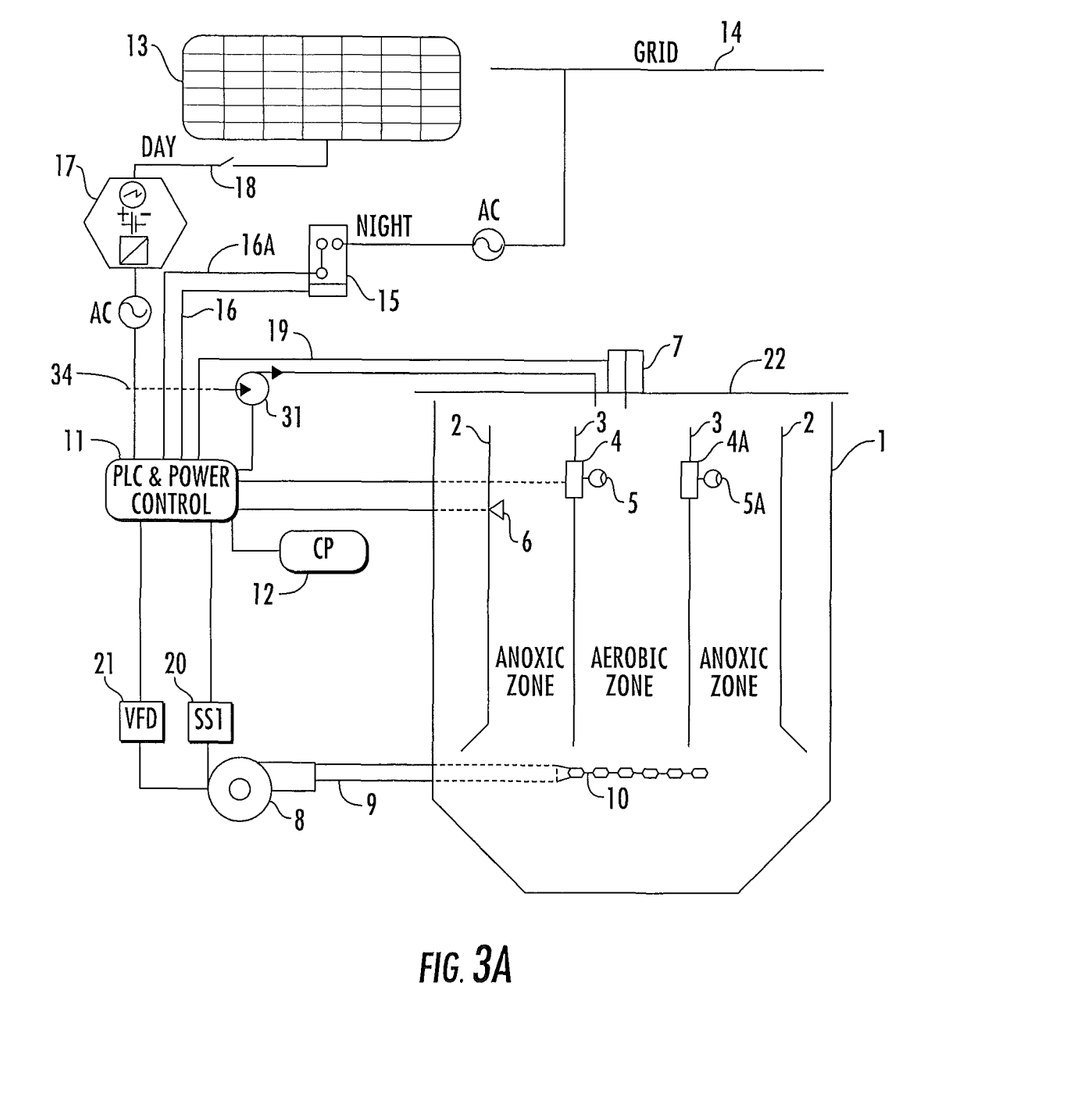
FIG. 3A illustrates an embodiment of the invention whereby a SVMB system is improved and/or optimized to reduce or minimize solar power requirements during daytime and to also reduce or minimize electric power requirements when working off the electric grid during darkness.

FIG. 3A illustrates an embodiment of the invention whereby a SVMB system 1. includes provisions for reducing or minimizing power usage during daylight hours and operations used in a treatment process during darkness periods. Among the benefits of some embodiments of the invention is that the size of solar panel arrays required is reduced or minimized and the battery bank capacity required is also reduced or minimized through the process change during darkness periods.

Embodiments of the present invention can be illustrated by the following example. A typical SVMB system with an average flow capacity of about 100 $m^3$/day may be used for a housing compound to reclaim water by treating the wastewater from the housing compound and allowing its reuse for watering lawns, gardens, car washing and other reuse. The vertical cylindrical vessel of the typical SVMB may a diameter of about 3.75 meters (12 feet and 4 inches), and a height of about 8.5 meters (27 feet and 4 inches). Its aerobic zone diameter may be about 1.01 meters (3 feet and 4 inches) and the anoxic zone diameter may be about 1.88 meters (6 feet and 2 inches). The influent into the SVMB may have a BOD-5 (Biological Oxygen Demand Over 5 Days) strength of 300 mg/l. The aeration requirements for biotreatment systems are typically up to 1.2 kilograms of air for each kilogram of BOD-5 removed. The illustrated SVMB has internal circular baffles 2 and 3 creating internal boundaries. The innermost aerobic zone is defined by baffle 3 and the adjacent concentric anoxic zone is defined by baffle 2.

A main electrical load of the illustrated SVMB system 1 is the aeration blower 8, which can require about 3-4 kWh at 9 psi during daylight hours while running, and about 6 times that during start-ups. In FIG. 3A that same power may be required when the SVMB operates off the solar panel array 13 during daylight hours and off the electrical power grid 14 during darkness periods. When used with a solar panel array 13, 3-4 kWh continuously can be required for the aeration blower 8 during daylight hours, and also about 3-4 kWh continuously when operating from the electrical power grid 14 during darkness periods.

To the aeration blower load is added the optional customer's influent pump 31, (when there is no gravity feeding of the influent), which in the illustrative system requires around 0.8 kWh. The influent pump 31 is typically located in a lifting station pit and its operation is controlled by float level switches sensing incoming discharge flows. When there is sufficient liquid in the pit, the operation of the influent pump 31 can be taken over by the PLC (Programmable Logic Controller) and power control system 11. The load of the rake motor 7 may be about 0.25 kWh. Thus, including the power requirements of the PLC (Programmable Logic Controller) and power control system 11 and control panel 12, plus an optional nutriment dosing pump (not shown) and disinfection chlorination dosing pump can add up to about 5 kWh running power required. Allowing for higher start-up currents and some reserve, the design power requirements of a traditional SVMB may thus be around 9 kWh, during daylight and darkness periods.

Thus, embodiments of the present invention may be used to reduce or minimize the cost of the solar panel array 13 and its ancillaries group 17 and reduce the continuous power requirements during darkness periods. In a SVMB system, the cost of the solar powering system with respect to the cost of the SVMB system may be an important consideration. For example, a SVMB with a capacity of 100 m$^3$/day of wastewater treatment would typically cost around $100,000. For solar powering, each kWh power capacity can cost around $4000 for the solar panel array 13 and its ancillaries group 17, plus installation, real estate costs, security provisions, etc., totaling to around $36,000 for powering the example SVMB system, which would rely on electric grid powering during darkness hours.

Referring again to FIG. 3A, an embodiment of the invention reduces the continuous power requirements of blower 8 of the SVMB during daytime periods, and further reduces it during darkness periods. This can be achieved by adding electrically adjustable ports 4 and 4A between the aerobic and anoxic zone and adding a variable frequency drive (VFD) 21 and soft starter 20 under the control of PLC and power control 11 and control panel 12. Flow monitors 5 and 5A monitor the flow from ports 4 and 4A, while dissolved oxygen (DO) sensor 6 reports the dissolved oxygen level in the anoxic zone. When two adjustable ports 4 and 4A are used, they can each be about 3 inches in diameter for the SVMB system according to some embodiments of the present invention. Adjustable ports 4 and 4A affect the retention times of the liquid in the aerobic and anoxic zones. Accordingly, the default opening of the adjustable ports can be set for the proper retention times with the help of the flow meters. An improved or ideal retention time for the SVMB is typically one third in the aerobic zone and two third in the anoxic zone. Adjustable ports 4 and 4A also affect the dissolved oxygen (DO) levels in the anoxic zone due to the flow they create of oxygen laden liquid from the aerobic zone into the anoxic zone.

When the SVMB system according to some embodiments of the present invention is in operation, VFD 21 controlled by PLC and power control 11 reduces the speed of the blower when proper DO levels of about 0.3 to about 0.5 mg/liter are reported in the anoxic zone. Thus, aeration blower 8 does not have to run at continuous full speed as in the prior art system that is in use, and reduces its power requirements. Furthermore, when higher DO level requirements occur in the anoxic zone with flow characteristic changes, instead of increasing the speed of aeration blower, PLC and power control 11 open the adjustable gates of ports 4 and 4A to increase the DO level in the anoxic zone, which merely requires a momentary adjustment of adjustable ports 4 and 4A and a momentary power draw. In other words, the PLC and power control 11 is configured to alter the speed of the blower 8 and/or control operation of the ports 4, 4A responsive to a signal from the DO sensor 6. Accordingly, aeration blower 8 does not have to operate at a higher speed and draw more power for routine DO increase requirements in the anoxic zone. Furthermore, the start-up current of aeration blower 8 is reduced or minimized as the VFD 21 can be programmed to start the aeration blower at a low or minimum speed and soft starter 20 can also substantially reduce the starting current. Thus, the overall continuous power consumption of the load may be significantly reduced when controlled in accordance with some embodiments of the invention.

During darkness periods, the power tracker (which would typically be part of the solar panel array ancillaries group 17) can report the inadequacy of sunlight, prompting PLC and power controller 11 to switch to the darkness period mode and operate switch 15 into 'night' mode, thereby connecting power line 16A to the electrical grid 14. The rake motor 7 powering through line 19 is interrupted during this mode and the treatment process is changed. During darkness periods, blower 8 is programmed to work at low speed, drawing a maximum of about 2 kW and working about 15 minutes/hour. During the darkness periods, higher DO level requirements in the anoxic zone will prompt PLC and power control 11 to adjust ports 4 and 4A to open further to introduce more oxygen laden liquid into the anoxic zone instead of increasing the speed of aeration blower 8. This process change works well because nighttime wastewater production is typically reduced in municipal systems and wastewater characteristics can be more uniform at night when the SVMB according to embodiments of the present invention is capable of working with less aeration for 10 to 12 hours. In the system of FIG. 3A, aeration blower 8 for a 100 m$^3$/day flow SVMB would produce a maximum of about 20 SCFM at about 9 psi during daytime, and maximum of about 5 SCFM at about 6 psi during darkness periods. As mentioned above, the maximum power requirements of aeration blower 8 during daytime and during darkness periods would be reduced by the action of ports 4 and 4A and the intermittent operation of the aeration blower 8 during darkness periods.

Another electrical load considered in some embodiments of the invention is the customer's influent pump 31 introducing influent 34 into the SVMB. The influent pump 31 may be needed when gravity flow is not possible. Pump 31 can also be equipped with a soft starter to reduce its normal starting power requirements of up to 6 times the running current. If an influent pump is used, its load can be reduced by partially burying the SVMB and reducing the pump head used to pump the influent into the SVMB. For the embodiment of FIG. 3A, partial burial of the SVMB by about 11 ft. may reduce the pump head from 25 GPM at 30 feet head to 19 feet head. The vessel construction cost may not be significantly affected. Also, in the 'darkness' mode, pump 31 is programmed to operate intermittently (for example, about 15 minutes/hour for a total of about 3 hours may be sufficient), since municipal wastewater flows are typically reduced during darkness periods and the SVMB of some embodiments of the invention can still operate satisfactorily with this process change.

Thus, the SVMB according to some embodiments of the invention as shown in FIG. 3A can achieve significant power usage savings during daytime and darkness hours, allowing the use of about a 5 kWh capacity solar panel array (and ancillaries) instead of the 9 kWh that may be required by some conventional systems, thus costing $20,000 or less, since smaller battery banks are required, saving the user at least $16,000 in the cost of the solar powering and substantial operating cost savings during darkness periods by the reduced electrical load of the SVMB, requiring only about 2 to 3 kWh intermittently. Thus, the solar powering system may cost 20% of the cost of the SVMB system according to some embodiments of the invention, instead of 36%.

Table 1 below provides data on the performance of an example 100 m$^3$/day flow capacity single vessel municipal wastewater biotreatment system according to some embodiments of the invention as in FIG. 3A. The SVMB system operates with solar powering during daytime and with a process change during darkness periods as discussed above with reference to FIG. 3A. The second column of Table 1 lists the power consumption of a system without the power consumption reduction modifications provided by some embodiments of the invention. The third column of Table 1 provides influent data for the system of FIG. 3A, which includes features in accordance with some embodiments of the invention to save power/reduce power consumption during daytime and during darkness periods. The fourth column of Table 1 provides the effluent data for the system of FIG. 3A and the lower power consumption data. The flows out of the system (the effluent) are slightly reduced (values are rounded up) because not all of influent goes into effluent due to a portion of the influent being converted to sludge during the wastewater biotreatment.

TABLE 1

| Average Values During 24 Hours 100 m$^3$/day flow Municipal SVMB | Traditional Solar & Grid Operation SVMB Power Consumption | FIG. 3A Invention Embodiment Influent | FIG. 3A Invention Embodiment Effluent |
| --- | --- | --- | --- |
| Flow m$^3$/12 Hours - Daytime | | 65 | 64 |
| Flow m$^3$/12 Hours - Darkness | | 35 | 34 |
| Average BOD-5 mg/liter | | 286 | 19 |
| Average TSS* mg/liter | | 267 | 21 |
| KW over 12 Hours Daylight | 74 | 54 | 54 |
| KW over 12 Hours Darkness | 74 | 31 | 31 |
| Total KW over 24 Hours | 148 | 85 | 85 |

*TSS is an abbreviation of Total Suspended Solids

Figure 3B:
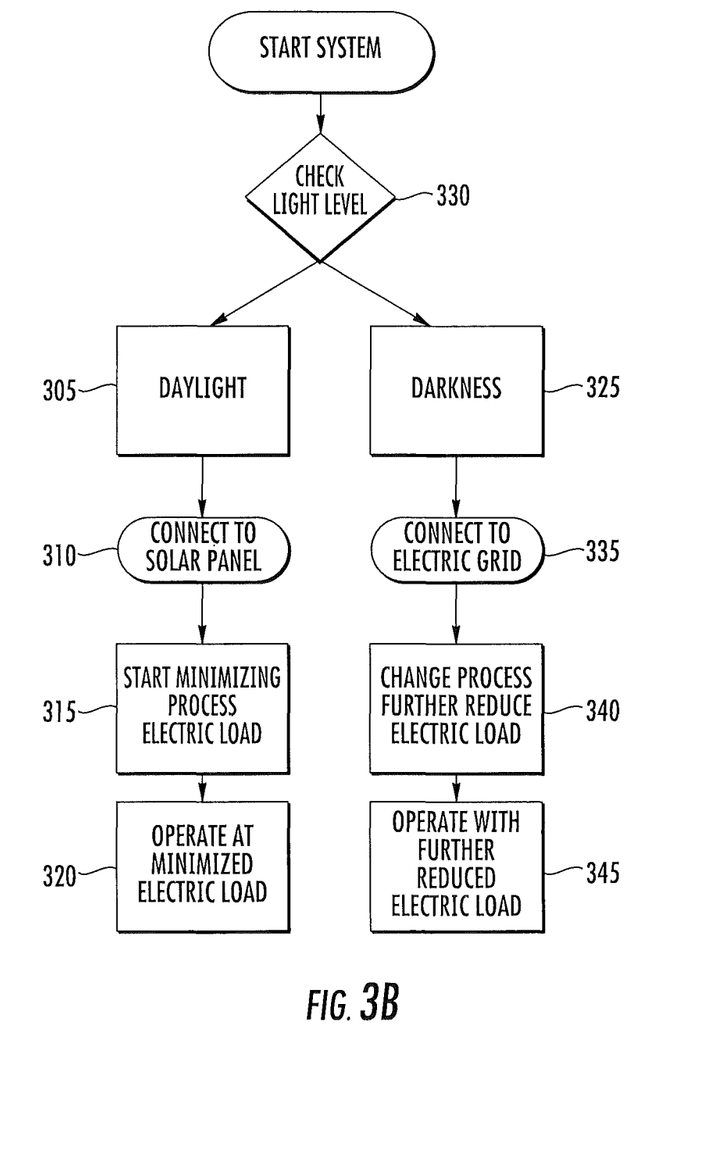
FIG. 3B is a flowchart illustrating a process performed by the embodiment of FIG. 3A.

FIG. 3B is a summary process flow chart illustrating operation of the SVMB of FIG. 3A. During daylight hours (block 305), the SVMB according to some embodiments of the invention is connected to the solar panel array 13 (block 310) and its ancillaries group 17 for powering, while the SVMB operates as shown in FIG. 3B to reduce or minimize power requirements (block 315), as described above with reference to FIG. 3A. A main load, the electric aeration blower 8 in FIG. 3A, does not have to run at full speed all the time and its start-up requirements are substantially reduced, allowing operation at reduced or minimized load (block 320).

The flow chart of FIG. 3B also illustrates the operation of the SVMB of FIG. 3A during darkness periods (block 325). The power tracking (solar energy sensor) in the solar powering ancillary group 17 determines that there is insufficient sunlight to continue operating the SVMB in the daylight mode (block 330). PLC and power control 11 then switches the modified SVMB to 'night' or darkness mode where the SVMB is powered by the electric grid (block 335) and the operation of the SVMB process is changed to further reduce electric power requirements (block 340) for operation during darkness periods (block 345).

Figure 4A:
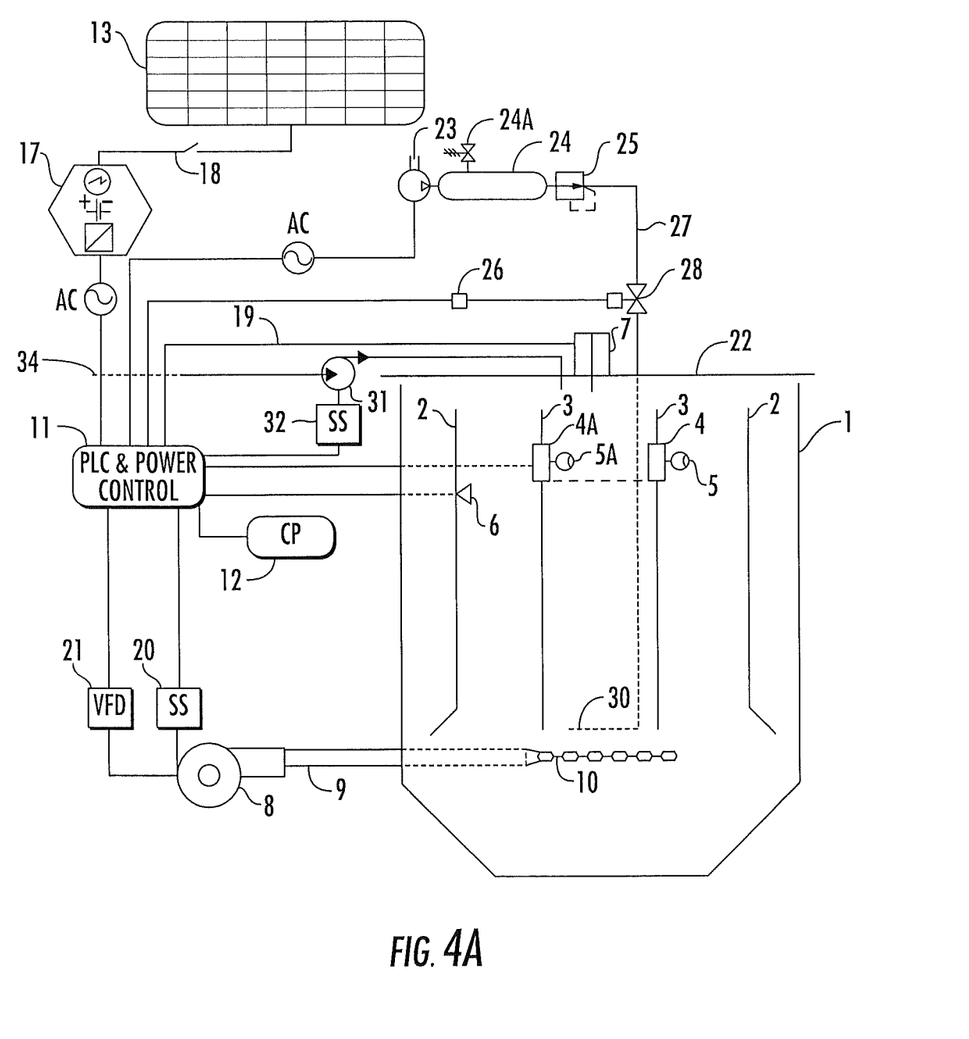
FIG. 4A illustrates another embodiment of the invention whereby the SVMB system of FIG. 3A reduces or minimizes solar power requirements during daytime and employs a variant treatment process during darkness periods for operation without electric grid powering requirements during the darkness periods.

FIG. 4A presents another embodiment of the invention. In this embodiment, the daylight operating mode of a municipal SVMB system that has a flow of about 100 m$^3$/day is similar to or the same as the daylight operating mode discussed above with reference to FIG. 3A. However, the SVMB of FIG. 4A further includes an air compressor 23 that stores compressed air in cylinder 24 during daylight hours for use of that compressed air for aeration during darkness periods. This embodiment thus reduces or eliminates the need for operation of the high electrical load aeration blower 8 during darkness periods, greatly reducing the power requirements during darkness periods.

More particularly, as shown in FIG. 4A, air compressor 23 and its air storage cylinder 24 are equipped with a pressure relief safety valve 24A and a pressure regulator 25 to control the pressure of the air released during 'night' mode operation. During darkness hours, the compressed air is delivered to solenoid valve 28 through air supply pipe 27. When the PLC and Power Control unit 11 energize solenoid valve 28 through relay 26, the compressed air is delivered to air diffuser array 30 at the bottom of the aerobic zone through pipe 29. In embodiments of the present invention, compressed air released intermittently can sufficiently provide aeration for the SVMB during darkness periods. During daylight hours, a variable speed compressor 23 with a power draw of 0.5 to 1 kWh can be used with a compressed air cylinder capable of holding 100 to 400 cubic feet of air within the allowable pressure range of the cylinder. Also, the PLC and control unit 11 can energize solenoid 28 for about 3 minutes every 20 minutes with the air pressure regulator 25 set for a pressure of 4-6 psi and provide aeration for the darkness period operation. In the event of unusually prolonged darkness periods and when required by the anoxic zone Dissolved Oxygen monitoring system in darkness periods, the battery bank and inverter of the solar panel array ancillary group 17 can intermittently power the compressor. Furthermore, during darkness periods, rake motor 7 can be deactivated without significant effect on the sludge treatment.

The influent pump 31, if used, may operate in a manner similar to the influent pump operation during darkness periods as described under FIG. 3A. In particular, during darkness periods, pump 31 is programmed to operate intermittently, such as for about 15 minutes/hour for a total of about 3 hours, since municipal wastewater flows are typically reduced at nighttime and the SVMB can still operate satisfactorily with the process change.

In the embodiment of FIG. 4A, the amount of solar power required during daytime operation can be reduced or minimized, making the solar panel array 13 and its ancillaries group 17 more effective with respect to capacity and/or cost. In the embodiment of FIG. 4A, blower 8 is not required during darkness periods; instead, the air that was compressed and stored during daylight hours by the air compressor 23 is gradually released during darkness periods to provide sufficient aeration under control of the PLC and power control unit 11. Adjustable ports 4 and 4A still help the aeration process (in a manner similar to that described above with reference to FIG. 3A) based on operation responsive to dissolved oxygen levels sensed by the DO sensors 6 in the anoxic zone. Although stored air supply is mentioned above for darkness periods, a SVMB according to some embodiments of the present invention, can treat the wastewater by mimicking the operation of a septic tank even when there is no aeration at all.

The embodiment of FIG. 4A represents an economical self-sustaining system that will allow the SVMB to operate without grid powering during darkness hours. For example, the influent pump 31 (if used) may operate for about 15 minutes per hour powered by the battery bank and inverter in the ancillaries group 17. Similarly, only small currents may be intermittently required from the battery bank and inverter of the ancillaries unit 17 for operating solenoid valve 28, adjustable ports 4 and 4A, the PLC and power control 11, control panel 12, and/or for other optional nutriment and disinfection intermittently dosing pumps.

If extended operation capability is desired for prolonged darkness periods, a larger output air compressor 23 and a larger capacity compressed air cylinder 24 can be used as desired. Alternately, a standby compressed air cylinder of the desired capacity can be added parallel to cylinder 24, with similar controls, as an auxiliary source of compressed air, powered by the larger output air compressor 23. When the PLC program determines that the power tracking (solar energy sensor) in the solar powering ancillary group 17 senses that there is insufficient light beyond programmed limits of darkness hours, the PLC and power control 11 extends the darkness hour program using the extra air capacity from the larger compressed air cylinder 24 or releasing the air from the standby compressed air cylinder when the air in compressed air cylinder 24 is depleted. The SVMB can further continue treating wastewater for up to several days by mimicking a septic tank when all air is depleted.

Table 2 below provides data on the performance of an example municipal 100 m³/day flow capacity SVMB system similar to the embodiment of FIG. 4A.

TABLE 2

| Average Values During 24 Hours 100 m³/day flow Municipal SVMB System | Traditional Solar & Grid Operation SVMB Power Consumption | FIG. 4A Embodiment Influent | FIG. 4A Embodiment Effluent |
| --- | --- | --- | --- |
| Flow m³/12 Hours - Daytime | | 66 | 65 |
| Flow m³/12 Hours - Darkness | | 34 | 33 |
| Average BOD-5 mg/liter | | 292 | 23 |
| Average TSS mg/liter | | 278 | 24 |
| KW over 12 Hours Daylight | 74 | 55 | 55 |
| KW over 12 Hours Darkness | 74 | 14 | 14 |
| Total KW over 24 Hours | 148 | 69 | 69 |

The SVMB, according to some embodiments of the present invention, operates with solar powering during daytime and with a process adjustment during darkness periods, as discussed above for FIG. 4A.

The third column of Table 2 provides influent data for the system of FIG. 4A, which includes features in accordance with some embodiments of the invention to save power/reduce power consumption during daytime and during darkness periods. As discussed above, in the embodiment of FIG. 4A, the aeration blower 8 is stopped and compressed air that is stored during daytime in cylinder 24 is periodically released for aeration, as controlled by the PLC and power control 11. The fourth column of Table 2 provides the effluent data for the system according to some embodiments of the present invention and the lower power consumption data. The flows out of the system (the effluent) are slightly reduced (values are rounded up) because not all of influent goes into the effluent due to a portion of the influent being converted to sludge during the wastewater biotreatment.

Figure 4B:
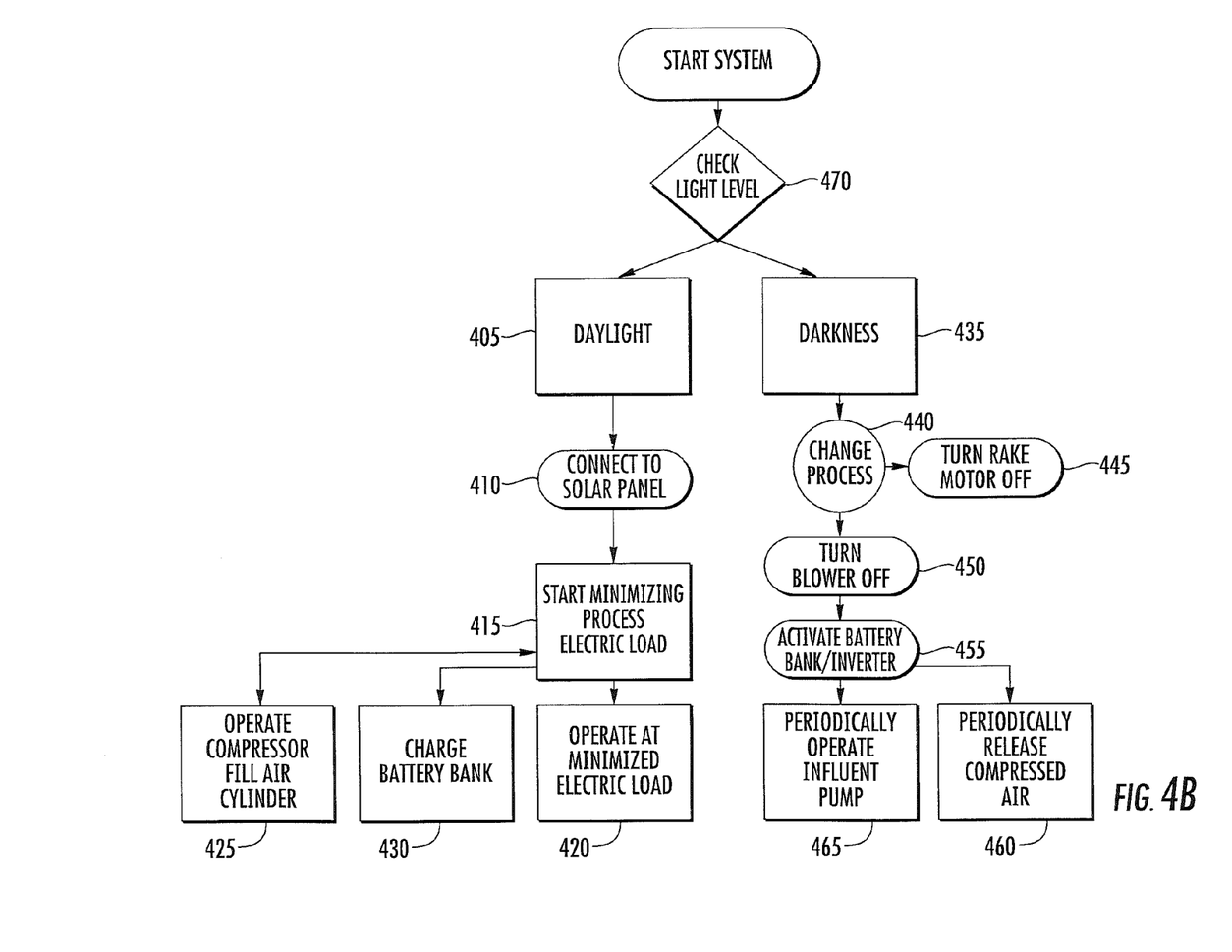
FIG. 4B is a flowchart illustrating a process performed by the embodiment of FIG. 4A.

FIG. 4B is a summary process flow chart illustrating operation of the SVMB of FIG. 4A. During daylight hours (block 405), the SVMB of some embodiments of the invention is connected to the solar panel array 13 (block 410) and its ancillaries group 17 for powering, while the SVMB operates as shown in FIG. 4B to reduce or minimize power requirements (block 415) as described under FIG. 3A, allowing operation at reduced or minimized load (block 420). A main load, the electric aeration blower 8, does not have to run at full speed all the time, aided by the activation of adjustable ports 4 and 4A. Also, the aeration blower's start-up requirements can be substantially reduced by the operation of the PLC and power control 11 causing VFD 21 to reduce the starting speed of the aeration blower and soft starter 20 further reducing the starting power requirements. During daylight hours, compressor 23 is activated to store air in an air cylinder 24 (block 425) as described with reference to FIG. 4A. Also during daylight hours, the battery bank in the solar powering ancillary group 7 is charged (block 430).

Referring further to FIG. 4B, during darkness hours (block 435) the process when there is insufficient sunlight (block 470) or operation of the SVMB is changed (block 440) in accordance with some embodiments of the invention. Upon sensing insufficient solar energy, the PLC and power control unit 11 turns off the rake motor 7 (block 445) and also aeration blower 8 (block 450). Certain functions of the SVMB, such as operation of the influent pump (block 465), can then be powered by the battery bank (block 455) in solar panel array ancillary group 17. During darkness periods, PLC and power control unit 11 cause the gradual release of the air stored in compressed air cylinder 24 (block 460) during daylight hours to provide aeration of the aerobic zone of the SVMB as discussed in detail above with reference to FIG. 4A.

Figure 5A:
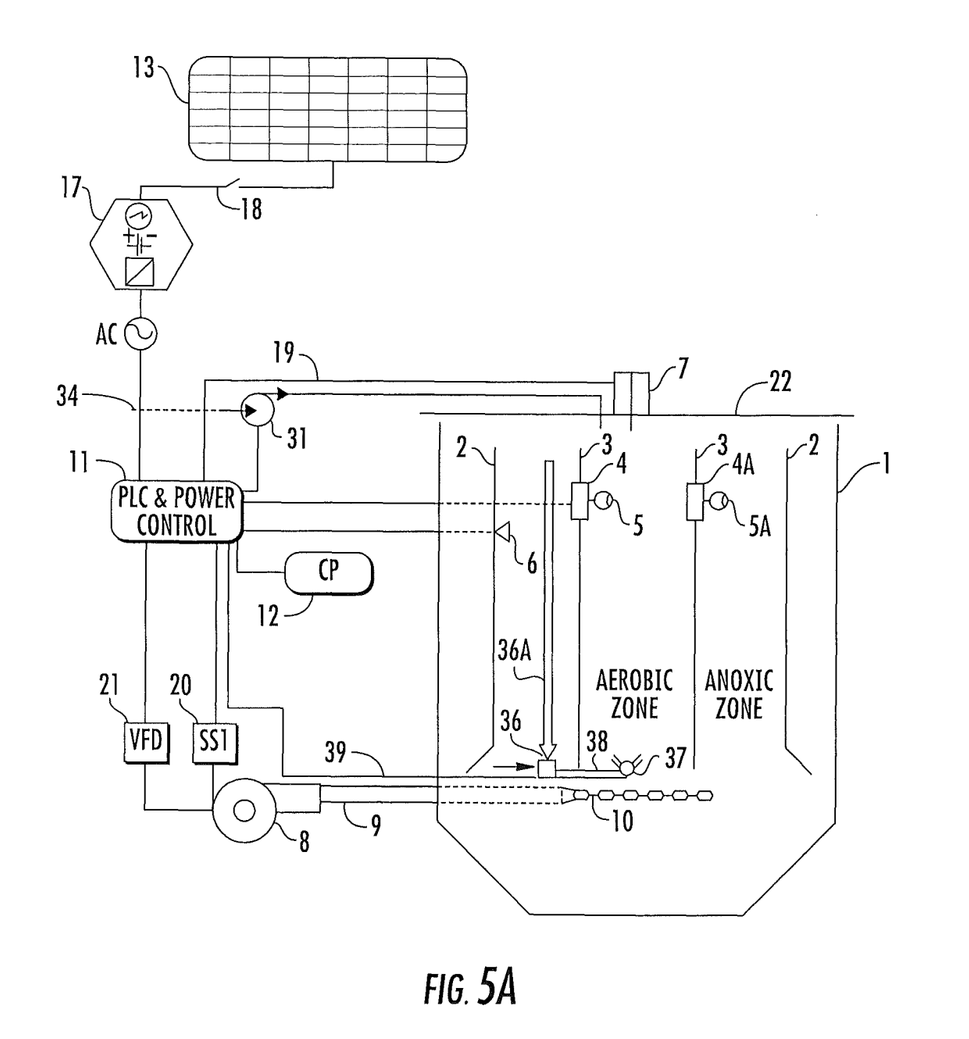
FIG. 5A illustrates another embodiment of the invention whereby the SVMB system of FIG. 3A reduces or minimizes solar power requirements during daytime and employs yet another process during darkness periods for operation without electric grid powering during darkness periods.

FIG. 5A presents another embodiment of the invention. In this embodiment, the daylight operating mode of a type of SVMB is similar to or the same as the daylight mode discussed with reference to FIG. 3A. However, the SVMB of FIG. 5A further includes an air mixer 36 operating along or according to Venturi principles, with air drawn into air mixer 36 by pipe 36A. This embodiment reduces or eliminates the need for the operation of the high electrical load aeration blower 8 during darkness periods, greatly reducing the power requirements during darkness periods.

In particular, as shown in FIG. 5A, air mixer 36 provides aeration to the aerobic zone of the SVMB during 'night' or darkness mode operation. PLC and power control unit 11 energizes air mixer 36 through powering line 39. The air generated is delivered to air diffuser 37 at the bottom of the aerobic zone through pipe 38. The air mixer motor for the illustrative system adds little to the power demands during nighttime, and a 0.5 kWh rated motor can provide sufficient aeration during darkness hours. For the embodiment of FIG. 5A, air mixer 36 can be operated for about 2 hours and 40 minutes during darkness periods, generating about 15 m3/hour of air at a head of 5 meters. The battery bank capacity in the ancillaries group 7 is designed or otherwise configured to operate air mixer 36 for about 2 hours and 40 minutes during darkness periods, as well as operate influent pump 31 intermittently if such a pump is used. The rake motor 7 can be turned off during 'night' or darkness period mode. If an influent pump 31 is used, it can be operated intermittently, similar to the influent pump operation during darkness periods as described with reference to FIG. 3A. During darkness periods, the pump 31 is programmed to operate intermittently, such as for about 15 minutes/hour for a total of 3 hours, since municipal wastewater, flows are typically reduced during nighttime and the SVMB according to embodiments of the present invention can still operate satisfactorily with the process change.

In the embodiment of FIG. 5A, the amount of solar power required during daytime operation can be reduced or minimized, making the solar panel array 13 and its ancillaries group 17 more effective with respect to capacity and/or cost. In the embodiment of FIG. 5A, blower 8 is not required during darkness periods; instead, the air generated by the air mixer 36 is gradually released during darkness periods under control of the PLC and control unit 11 to provide sufficient aeration. Although air volume capacity is provided for darkness periods, the SVMB according to some embodiments of the present invention can operate with lesser air as it can mimic the operation of a septic tank even when there is no aeration at all. The embodiment of FIG. 5A represents an economical and self-sustaining system that can allow a SVMB to operate without electric grid powering during darkness hours. For example, the influent pump 31 (if used) can operate for about 15 minutes per hour for three hours, powered by the battery bank and inverter in the ancillaries group 17. Similarly, modest currents may be intermittently required from the battery bank of the ancillaries group 17 for operating the PLC and power control 11, control panel 12, air mixer 36, intermittently operating influent pump 31 (if used), adjustments of ports 4 and 4A, and/or other optional nutriment and disinfection intermittently dosing pumps. The overall power requirements and costs of the solar panel array 13 and its ancillaries group 17 can be greatly reduced during daylight hours and even further reduced during darkness hours through the process change whereby this embodiment provides a self-sustained operation.

Table 3 below provides data on the performance of the previously mentioned illustrative 100 m³/day flow capacity single vessel municipal wastewater biotreatment system according to some embodiments of the invention, similar to the system of FIG. 5A. The SVMB operates using solar powering during daytime and with a process adjustment during darkness periods as discussed above with reference to FIG. 5A. The third column of Table 3 provides influent data for the system of FIG. 5A, which includes features in accordance with some embodiments of the invention to save power/reduce power consumption during daytime and during darkness periods. As discussed above, in the embodiment of FIG. 5A, the aeration blower 8 is stopped and an air mixer 36 is periodically operated to provide aeration. The fourth column of Table 3 provides the effluent data for the system and the lower power consumption data. The flows out of the system (the effluent) are slightly reduced (values are rounded up) because not all of influent goes into the effluent due to a portion of the influent being converted to sludge during the wastewater biotreatment.

TABLE 3

| Average Values During 24 Hours 100 m³/day flow Municipal SVMB System | Traditional Solar & Grid Operation SVMB Power Consumption | FIG. 5 Embodiment Influent | FIG. 5 Embodiment Effluent |
|---|---|---|---|
| Flow m³/12 Hours - Daytime | | 66 | 65 |
| Flow m³/12 Hours - Darkness | | 34 | 33 |
| Average BOD-5 mg/liter | | 296 | 24 |
| Average TSS mg/liter | | 275 | 22 |
| KW over 12 Hours Daylight | 74 | 52 | 52 |
| KW over 12 Hours Darkness | 74 | 35 | 35 |
| Total KW over 24 Hours | 148 | 87 | 87 |

Figure 5B:
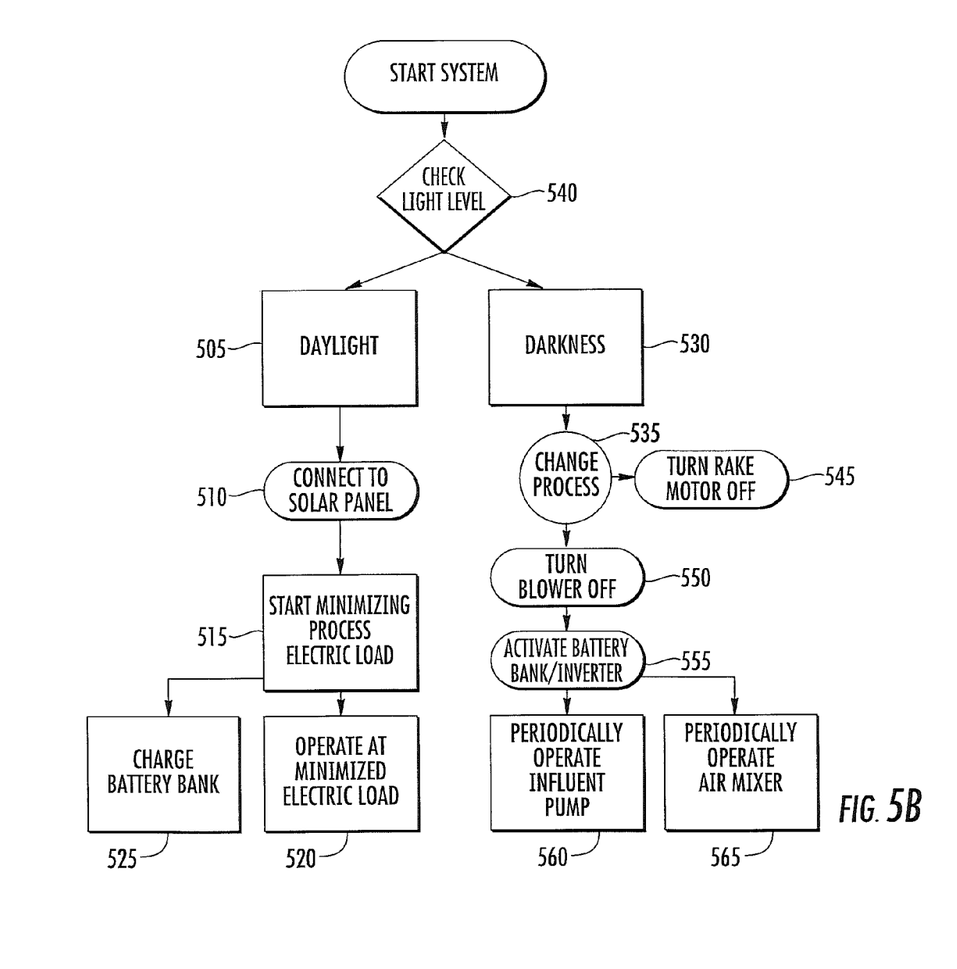
FIG. 5B is a flowchart illustrating a process performed by the embodiment of FIG. 5A.

FIG. 5B presents a summary process flow chart of illustrating operation of the SVMB of FIG. 5A. During daylight hours (block 505), the SVMB is connected to the solar panel array 13 (block 510) and its ancillaries group 17 for powering, while the SVMB operates as shown in FIG. 5B to reduce or minimize power requirements (block 515) as described under FIG. 3A, allowing operation at reduced or minimized load (block 520). During daylight hours, a main load, the electric aeration blower 8, does not have to run at full speed all the time and its start-up requirements are substantially reduced. During daylight hours, the battery bank in the solar powering ancillary group 7 is charged (block 525). Referring further to FIG. 5B, in the embodiment of FIG. 5A, the process of the SVMB is changed (block 535) during darkness hours (block 530). Upon sensing insufficient solar energy (block 540), the PLC and power control unit 11 turns off the rake motor 7 (block 545) and also aeration blower 8 (block 550). One or more functions of the SVMB can then be powered by the battery bank (block 555) in the ancillaries group 17, such as for periodically operating influent pump 31 (block 560) (if used) and/or air mixer 36 (block 565). During darkness periods, PLC and power control unit 11 cause the air mixer 36 to intermittently provide aeration of the aerobic zone of the SVMB as discussed in detail above with reference to FIG. 5A.

The SVMB according to some embodiments of the present invention may have the capacity to treat up to 100 cubic meters of wastewater or more, per day (26,400 gallons per day). However, any or all the elements and embodiments of the invention, as described in the figures, can be scaled up, just as the modified SVMB itself can be scaled up for substantial savings and self-sustained operation. For example, an application may employ 8 SVMB systems in parallel for treating up to 42,000 cubic meters of wastewater per day (11,088,000 gallons per day). The larger the capacity of the SVMB according to some embodiments of the present invention, the greater can be the scaled up savings in solar powering and self-sustained operation of such systems by employing the approaches of the embodiments of the invention. The various embodiments of the invention can employ a single-axis or multiple-axis solar tracker for improved positioning of the solar array at all times during daylight hours.

The present invention has been described above with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. For example, although described herein primarily with reference to single vessel multi-zone bioreactor (SVMB) water reclamation systems, it will be understood that the inventive concepts described herein can be applied to non-SVMB systems as well, for instance, by controlling the operation of one or more high-power consumption elements and/or additional elements responsive to feedback from a dissolved oxygen or other sensor. In the drawings, the thickness of layers and regions are exaggerated for clarity. Like numbers refer to like elements throughout.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. In no event, however, should "on" or "directly on" be construed as requiring a layer to cover an underlying layer. It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or sub combination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

What is claimed:

1. A method for solar powering and self-sustained operation of a single vessel biotreatment system (SVMB), wherein the SVMB includes adjacent aerobic and anoxic zones, the method comprising:
   sensing sufficient sunlight during daytime periods by a power tracker, wherein, responsive to sensing the sufficient sunlight, the method comprises:
      powering, by a solar panel array, said SVMB and its ancillaries group and a programmable logic controller (PLC) and power controller and starting a rake motor;
      controlling a speed of an aeration blower using a variable frequency drive, wherein the speed of the aeration blower controls dissolved oxygen levels in the aerobic and anoxic zones;
      controlling the dissolved oxygen levels in said anoxic zone using adjustable ports located between the aerobic and anoxic zones to flow oxygen laden liquid from the aerobic zone into the anoxic zone;
      selectively operating said adjustable ports to increase the dissolved oxygen levels in said anoxic zone in lieu of adjusting the speed of said aeration blower to increase the dissolved oxygen levels in said anoxic zone;
      operating a compressor during daylight hours to fill air into an air cylinder; and
      operating an influent pump responsive to liquid levels indicated by level switches;
      charging a battery bank by said solar panel array and an inverter;
   sensing insufficient sunlight by said power tracker, wherein, responsive to sensing the insufficient sunlight, the method comprises:
      switching said SVMB into darkness period operating mode using said battery bank and said inverter responsive to operation of the PLC and power controller;
      stopping said aeration blower responsive to switching said SVMB into the darkness period operating mode;
      stopping said rake motor;
      controlling intermittent air release from said air cylinder into said aerobic zone when said aeration blower is stopped; and
      controlling the dissolved oxygen levels in said anoxic zone independent of said aeration blower by opening said adjustable ports to introduce the oxygen laden liquid from the aerobic zone into the anoxic zone when said aeration blower is stopped, responsive to the intermittent air release from said air cylinder into said aerobic zone.

2. The method of claim 1 further comprising positioning the solar panel array using a single-axis or multi-axis tracker to improve solar energy input into the solar panel array during sunlight hours.

3. The method of claim 1, wherein, responsive to sensing the insufficient sunlight, the controlling the intermittent air release from said air cylinder and the controlling the dissolved oxygen levels in said anoxic zone using said adjustable ports are performed without electric grid powering.

4. The method of claim 3, wherein a capacity of the battery bank is insufficient to power the aeration blower of said SVMB in the darkness period operating mode without the electric grid powering, but is sufficient to control said air cylinder and said adjustable ports without the electric grid powering.

5. A method for solar powering and self-sustained operation of a single vessel biotreatment system (SVMB), wherein the SVMB includes adjacent aerobic and anoxic zones, the method comprising:
   sensing, by a power tracker, sufficient sunlight during daytime periods, wherein, responsive to sensing the sufficient sunlight, the method comprises:
      powering, by a solar panel array, said SVMB and its ancillaries group and a programmable logic controller (PLC) and power controller and a starting rake motor;
      controlling a speed of an aeration blower using a variable frequency drive, wherein the speed of the aeration blower controls dissolved oxygen levels in the aerobic and anoxic zones;
      controlling the dissolved oxygen levels in said anoxic zone using adjustable ports located between the aerobic and anoxic zones to flow oxygen laden liquid from the aerobic zone into the anoxic zone;
      selectively operating said adjustable ports to increase the dissolved oxygen levels in said anoxic zone in lieu of adjusting the speed of said aeration blower to increase the dissolved oxygen levels in said anoxic zone; and
      operating an influent pump responsive to liquid levels indicated by level switches;
      charging a battery bank by said solar panel array and an inverter;
   sensing, by said power tracker, insufficient sunlight, wherein, responsive to sensing the insufficient sunlight, the method comprises:
      switching, by said PLC and power controller, said SVMB into darkness period operating mode using said battery bank and said inverter;
      stopping said aeration blower responsive to switching said SVMB into the darkness period operating mode;
      stopping said rake motor;
      operating an air mixer periodically to aerate said aerobic zone when said aeration blower is stopped; and
      opening said adjustable ports to control the dissolved oxygen levels in said anoxic zone independent of said aeration blower, to introduce the oxygen laden liquid from the aerobic zone into the anoxic zone when said aeration blower is stopped, responsive to operating said air mixer to aerate said aerobic zone.

6. The method of claim 5 further comprising positioning the solar panel array using a single-axis or multi-axis tracker to improve solar energy input into the solar panel array during sunlight hours.

7. The method of claim 5, wherein, responsive to sensing the insufficient sunlight, the operating said air mixer and the operating said adjustable ports are performed without electric grid powering.

8. The method of claim 7, wherein a capacity of the battery bank is insufficient to power the aeration blower of said SVMB in the darkness period operating mode without the electric grid powering, but is sufficient to operate said air mixer and said adjustable ports without the electric grid powering.

\* \* \* \* \*